(12) United States Patent
Li et al.

(10) Patent No.: US 12,119,954 B2
(45) Date of Patent: Oct. 15, 2024

(54) HOUSEHOLD APPLIANCES COMPONENT TRACKING SYSTEMS AND METHODS

(71) Applicant: Haier US Appliance Solutions, Inc., Wilmington, DE (US)

(72) Inventors: Hairong Li, Louisville, KY (US); John Ouseph, Prospect, KY (US); Haitian Hu, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 397 days.

(21) Appl. No.: 17/725,723

(22) Filed: Apr. 21, 2022

(65) Prior Publication Data

US 2023/0344668 A1 Oct. 26, 2023

(51) Int. Cl.
*H04L 12/28* (2006.01)
(52) U.S. Cl.
CPC .............................. *H04L 12/2807* (2013.01)
(58) Field of Classification Search
CPC .................................................. H04L 12/2807
USPC ....................................................... 709/220
See application file for complete search history.

(56) References Cited

U.S. PATENT DOCUMENTS

| 7,870,312 | B2 | 1/2011 | Thomas |
| 8,752,396 | B2 | 6/2014 | Chaudhry |
| 10,333,731 | B2 | 6/2019 | Ebrom et al. |
| 10,363,476 | B2 | 7/2019 | DeAngelis et al. |
| 10,872,540 | B2 | 12/2020 | Steketee et al. |
| 2014/0152835 | A1* | 6/2014 | Chen ...................... H04N 7/185 348/158 |
| 2018/0211718 | A1* | 7/2018 | Heath .................... G16H 80/00 |

FOREIGN PATENT DOCUMENTS

| CN | 112990395 A | 6/2021 |
| WO | WO2020117885 A1 | 6/2020 |
| WO | WO2020240576 A1 | 12/2020 |

* cited by examiner

*Primary Examiner* — Sibte H Bukhari
(74) *Attorney, Agent, or Firm* — Dority & Manning, P.A.

(57) ABSTRACT

A method of operating a household appliance includes installing a multi-source mechanical component in the household appliance. The method also includes storing an identity of the multi-source mechanical component in a local memory of the household appliance. The method further includes connecting the household appliance to a remote computing device. The method also includes storing the identity of the multi-source mechanical component in the remote computing device.

14 Claims, 7 Drawing Sheets

HOUSEHOLD APPLIANCES COMPONENT TRACKING SYSTEMS AND METHODS

FIELD OF THE INVENTION

The present subject matter relates generally to household appliances, and more particularly to systems and methods for tracking components of a household appliance.

BACKGROUND OF THE INVENTION

Household appliances are utilized generally for a variety of tasks by a variety of users. For example, a household may include such appliances as laundry appliances, e.g., a washer and/or dryer, kitchen appliances, e.g., a refrigerator, a dishwasher, etc., along with room air conditioners and other various appliances.

Household appliances include numerous components and sub-assemblies, such as motors, pumps, fans, compressors, heating elements, and so forth. Some such components may be sourced from a supplier and installed into the final product by the manufacturer rather than built from scratch by the manufacturer. In some cases, a particular component may be sourced from multiple suppliers for the same line of household appliances, and the components procured from different suppliers may have different features or different configurations, such as different electrical power requirements for different motors from different suppliers in the same line of household appliances, e.g., dishwasher appliances.

Thus, there is a need to track the specific components of each household appliance unit, especially when one or more of the components are obtained from one of multiple possible sources. For example, one or more redundant backups of the household appliance component tracking would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating a household appliance is provided. The method includes installing a multi-source mechanical component in the household appliance. The method also includes storing an identity of the multi-source mechanical component in a local memory of the household appliance. The method further includes connecting the household appliance to a remote computing device. The method also includes storing the identity of the multi-source mechanical component in the remote computing device.

In another exemplary aspect of the present disclosure, a household appliance is provided. The household appliance includes a multi-source mechanical component. The household appliance also includes a controller in operative communication with the multi-source mechanical component. The controller is configured for storing an identity of the multi-source mechanical component in a local memory of the household appliance. The controller is further configured for connecting the household appliance to a remote computing device. The controller is also configured for transmitting the identity of the multi-source mechanical component to the remote computing device.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
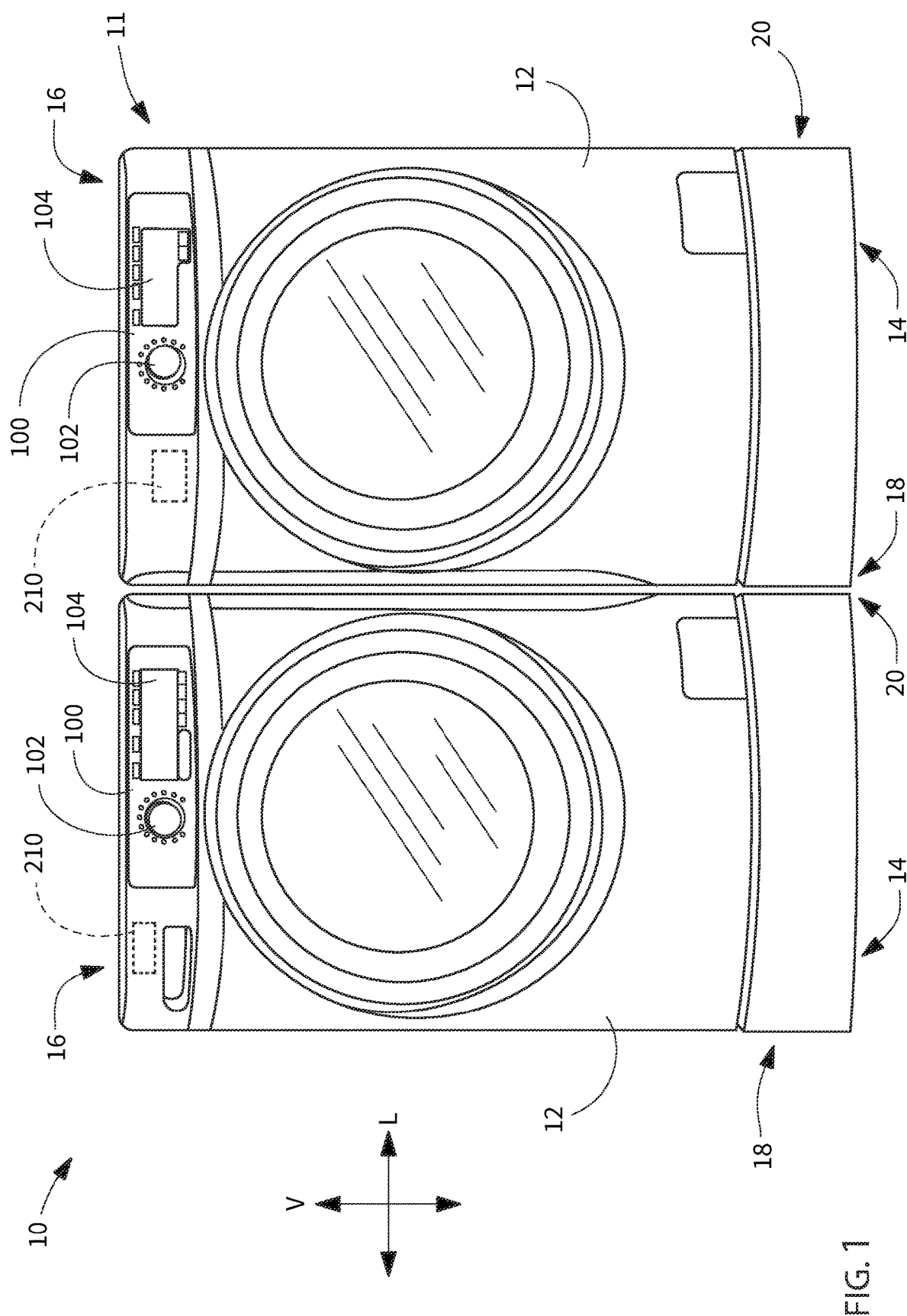
FIG. 1 provides a front view of an exemplary washing machine appliance and an exemplary dryer appliance in accordance with one or more exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Figure 2:
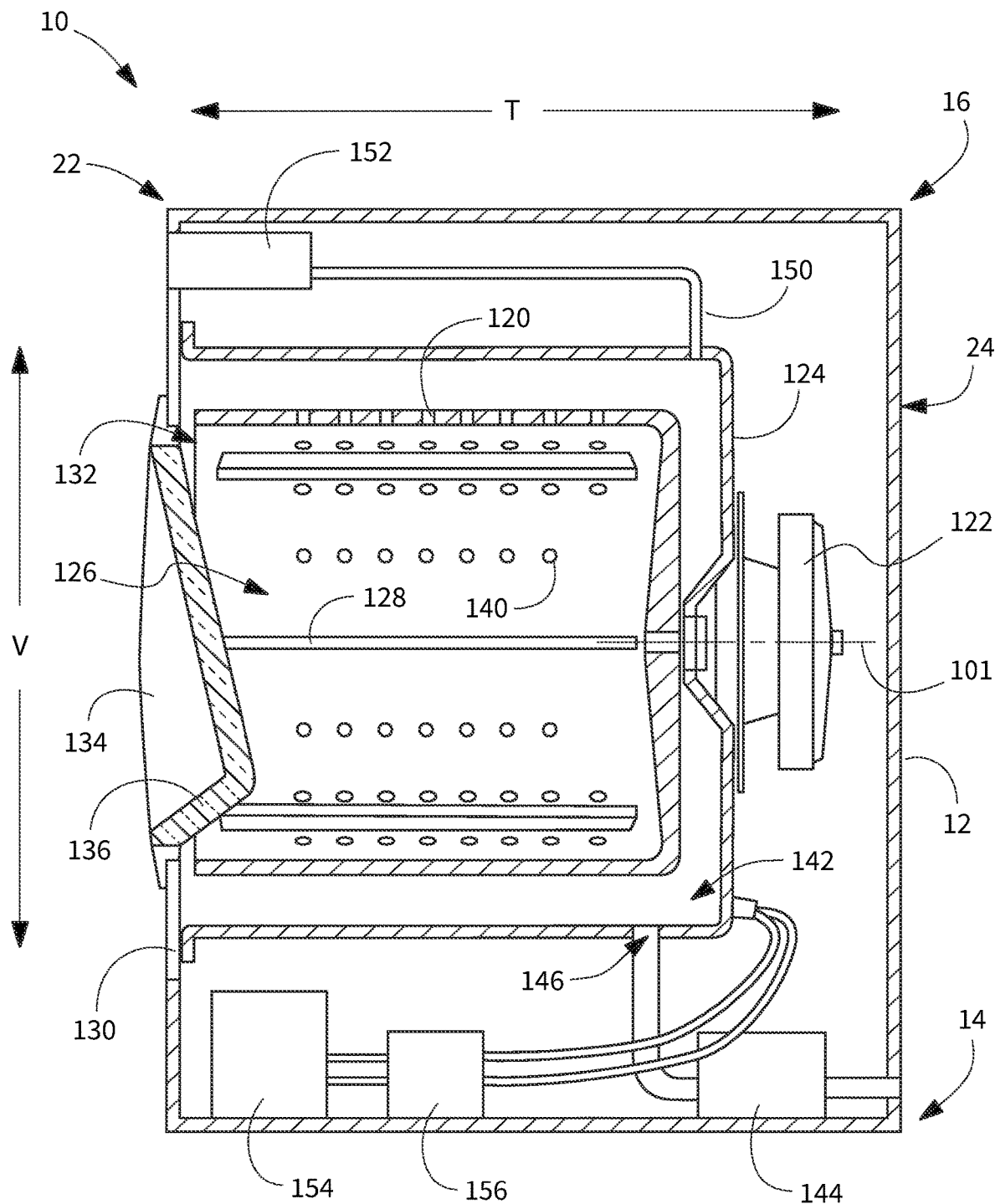
FIG. 2 provides a side cross-sectional view of the exemplary washing machine appliance of FIG. 1.
Figure 3:
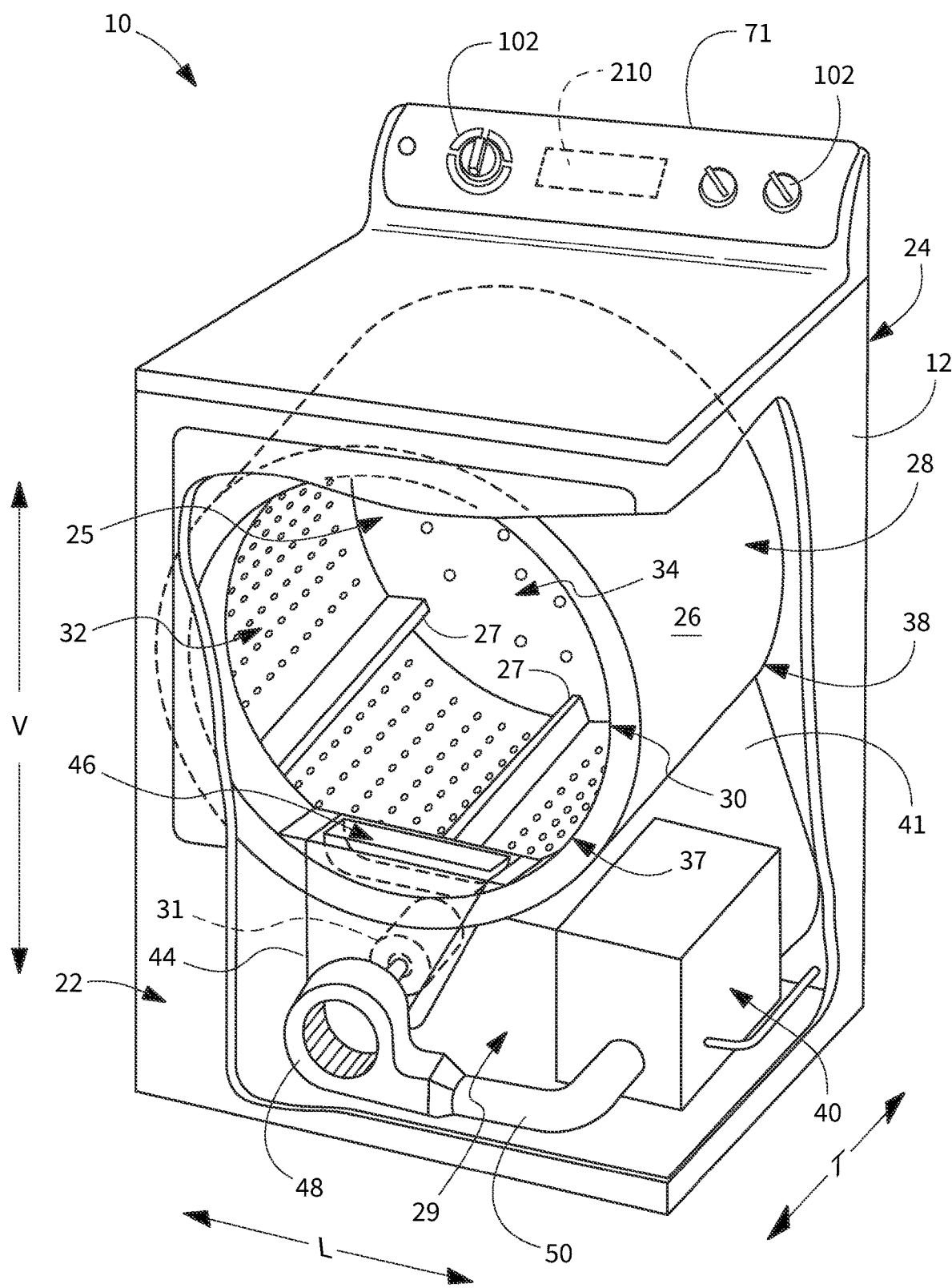
FIG. 3 provides a perspective view of the exemplary dryer appliance of FIG. 1 with portions of a cabinet of the laundry appliance removed to reveal certain components of the dryer appliance.

As may be seen in FIGS. 1 through 3, in accordance with one or more embodiments of the present subject matter, a household appliance may be a washing machine appliance 10 or a dryer appliance 11. The dryer appliance 11 is separately labelled in FIG. 1 to distinguish the dryer appliance 11 from the washing machine appliance 10, where both the washing machine appliance 10 and the dryer appliance 11 are example embodiments of a household appliance 10 which may be usable in one or more exemplary methods described herein and/or may be operable and configured to perform such methods.

As generally seen throughout FIGS. 1 through 5, in at least some embodiments, the household appliance 10 or each appliance 10 includes a cabinet 12 which defines a vertical direction V, a transverse direction T, and a lateral direction L that are each mutually perpendicular to every other. Each cabinet 12 extends between a top side 16 and a bottom side 14 along the vertical direction V. Each cabinet 12 also extends between a left side 18 and a right side 20, e.g., along the lateral direction L. The cabinet 12 may also extend between a front side 22 and a rear side 24 (FIGS. 2 and 3), e.g., along the transverse direction T.

Each household appliance 10 may include a user interface panel 100 and a user input device 102 which may be positioned on an exterior of the cabinet 12. The user input device 102 is generally positioned proximate to the user interface panel 100, and in some embodiments, the user input device 102 may be positioned on the user interface panel 100.

In various embodiments, the user interface panel 100 may represent a general purpose I/O ("GPIO") device or functional block. In some embodiments, the user interface panel 100 may include or be in operative communication with user input device 102, such as one or more of a variety of digital, analog, electrical, mechanical or electro-mechanical input devices including rotary dials, control knobs, push buttons, and touch pads. The user interface panel 100 may include a display component 104, such as a digital or analog display device designed to provide operational feedback to a user. The display component 104 may also be a touchscreen capable of receiving a user input, such that the display component 104 may also be the user input device 102 or one of the input devices 102.

Generally, each appliance 10 may include a controller 210 in operative communication with the user input device 102. The user interface panel 100 and the user input device 102 may be in communication with the controller 210 via, for example, one or more signal lines or shared communication busses. Input/output ("I/O") signals may be routed between controller 210 and various operational components of the appliance 10. Operation of the appliance 10 may be regulated by the controller 210 that is operatively coupled to the corresponding user interface panel 100. A user interface panel 100 may for example provide selections for user manipulation of the operation of an appliance, e.g., via user input device 102 and/or display 104. In response to user manipulation of the user interface panel 100 and/or user input device 102, the controller 210 may operate various components of the appliance 10 or 11. Each controller 210 may include a memory and one or more microprocessors, CPUs or the like, such as general or special purpose microprocessors operable to execute programming instructions or micro-control code associated with operation of the appliance 10. The memory may represent random access memory such as DRAM, or read only memory such as ROM or FLASH. In one embodiment, the processor executes programming instructions stored in memory. The memory may be a separate component from the processor or may be included onboard within the processor. Alternatively, a controller 210 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

The controller 210 may be programmed to operate the respective appliance 10 by executing instructions stored in memory. For example, the instructions may be software or any set of instructions that when executed by the processing device, cause the processing device to perform operations. Controller 210 can include one or more processor(s) and associated memory device(s) configured to perform a variety of computer-implemented functions and/or instructions (e.g. performing the methods, steps, calculations and the like and storing relevant data as disclosed herein). It should be noted that controllers 210 as disclosed herein are capable of and may be operable to perform any methods and associated method steps as disclosed herein.

In some embodiments, for example, as illustrated in FIG. 1, the household appliance 10 and 11 may be one (or both) of a pair of laundry appliances. In embodiments such as illustrated in FIG. 1, the user input device 102 of each appliance 10 and 11 may be positioned on the user interface panel 100. The embodiment illustrated in FIG. 1 also includes a display 104 on the user interface panel 100 of each household appliance 10 and 11.

Additional exemplary details of the laundry appliances are illustrated in FIGS. 2 and 3. For example, FIG. 2 provides a cross-sectional view of the exemplary washing machine appliance 10. As illustrated in FIG. 2, a wash tub 124 is non-rotatably mounted within cabinet 12. As may be seen in FIG. 2, the wash tub 124 defines a central axis 101. In the example embodiment illustrated by FIG. 2, the central axis 101 may be oriented generally along or parallel to the transverse direction T of the washing machine appliance 10. Accordingly, the washing machine appliance 10 may be referred to as a horizontal axis washing machine.

Referring again to FIG. 2, a wash basket 120 is rotatably mounted within the tub 124 such that the wash basket 120 is rotatable about an axis of rotation, which generally coincides with central axis 101 of the tub 124. A motor 122, e.g., such as a pancake motor, is in mechanical communication with wash basket 120 to selectively rotate wash basket 120 (e.g., during an agitation or a rinse cycle of washing machine appliance 10). Wash basket 120 defines a wash chamber 126 that is configured for receipt of articles for washing. The wash tub 124 holds wash and rinse fluids for agitation in wash basket 120 within wash tub 124. As used herein, "wash fluid" may refer to water, detergent, fabric softener, bleach, or any other suitable wash additive or combination thereof. The wash basket 120 and the tub 124 may collectively define at least a portion of a tub assembly for the washing machine appliance 10.

Wash basket 120 may define one or more agitator features that extend into wash chamber 126 to assist in agitation and cleaning of articles disposed within wash chamber 126 during operation of washing machine appliance 10. For example, as illustrated in FIG. 2, a plurality of ribs 128 extends from basket 120 into wash chamber 126. In this manner, for example, ribs 128 may lift articles disposed in wash basket 120 during rotation of wash basket 120.

Referring generally to FIGS. 1 and 2, cabinet 12 also includes a front panel 130 which defines an opening 132 that permits user access to wash basket 120 within wash tub 124. More specifically, washing machine appliance 10 includes a door 134 that is positioned in front of opening 132 and is rotatably mounted to front panel 130. Door 134 is rotatable such that door 134 permits selective access to opening 132 by rotating between an open position (not shown) facilitating access to a wash tub 124 and a closed position (FIG. 1) prohibiting access to wash tub 124.

A window 136 in door 134 permits viewing of wash basket 120 when door 134 is in the closed position, e.g., during operation of washing machine appliance 10. Door 134 also includes a handle (not shown) that, e.g., a user may pull when opening and closing door 134. Further, although door 134 is illustrated as mounted to front panel 130, it should be appreciated that door 134 may be mounted to another side of cabinet 12 or any other suitable support according to alternative embodiments.

Referring again to FIG. 2, wash basket 120 also defines a plurality of perforations 140 in order to facilitate fluid communication between an interior of basket 120 and wash tub 124. A sump 142 is defined by wash tub 124 at a bottom of wash tub 124 along the vertical direction V. Thus, sump 142 is configured for receipt of and generally collects wash fluid during operation of washing machine appliance 10. For example, during operation of washing machine appliance 10, wash fluid may be urged by gravity from basket 120 to sump 142 through plurality of perforations 140. A pump assembly 144 is located beneath tub 124 for gravity assisted flow when draining tub 124, e.g., via a drain 146. Pump assembly 144 may be configured for recirculating wash fluid within wash tub 124.

A spout 150 is configured for directing a flow of fluid into wash tub 124. For example, spout 150 may be in fluid communication with a water supply (not shown) in order to direct fluid (e.g., clean water) into wash tub 124. Spout 150 may also be in fluid communication with the sump 142. For example, pump assembly 144 may direct wash fluid disposed in sump 142 to spout 150 in order to circulate wash fluid in wash tub 124.

As illustrated in FIG. 2, a detergent drawer 152 is slidably mounted within front panel 130. Detergent drawer 152 receives a wash additive (e.g., detergent, fabric softener, bleach, or any other suitable liquid or powder) and directs the fluid additive to wash chamber 124 during operation of washing machine appliance 10. According to the illustrated embodiment, detergent drawer 152 may also be fluidly coupled to spout 150 to facilitate the complete and accurate dispensing of wash additive.

Additionally, a bulk reservoir 154 is disposed within cabinet 12. Bulk reservoir 154 is also configured for receipt of fluid additive for use during operation of washing machine appliance 10. Bulk reservoir 154 is sized such that a volume of fluid additive sufficient for a plurality or multitude of wash cycles of washing machine appliance 10 (e.g., five, ten, twenty, fifty, or any other suitable number of wash cycles) may fill bulk reservoir 154. Thus, for example, a user can fill bulk reservoir 154 with fluid additive and operate washing machine appliance 10 for a plurality of wash cycles without refilling bulk reservoir 154 with fluid additive. A reservoir pump 156 is configured for selective delivery of the fluid additive from bulk reservoir 154 to wash tub 124.

During operation of washing machine appliance 10, laundry items are loaded into wash basket 120 through opening 132, and washing operation is initiated through operator manipulation of input selectors 102. Wash tub 124 is filled with water, detergent, and/or other fluid additives, e.g., via spout 150 and/or detergent drawer 152. One or more valves (not shown) can be controlled by washing machine appliance 10 to provide for filling wash basket 120 to the appropriate level for the amount of articles being washed and/or rinsed. By way of example for a wash mode, once wash basket 120 is properly filled with fluid, the contents of wash basket 120 can be agitated (e.g., with ribs 128) for washing of laundry items in wash basket 120.

After the agitation phase of the wash cycle is completed, wash tub 124 can be drained. Laundry articles can then be rinsed by again adding fluid to wash tub 124, depending on the particulars of the cleaning cycle selected by a user. Ribs 128 may again provide agitation within wash basket 120. One or more spin cycles may also be used. In particular, a spin cycle may be applied after the wash cycle and/or after the rinse cycle in order to wring wash fluid from the articles being washed. During a spin cycle, basket 120 is rotated at relatively high speeds. After articles disposed in wash basket 120 are cleaned and/or washed, the user can remove the articles from wash basket 120, e.g., by opening door 134 and reaching into wash basket 120 through opening 132.

While described in the context of a specific embodiment of horizontal axis washing machine appliance 10, using the teachings disclosed herein it will be understood that horizontal axis washing machine appliance 10 is provided by way of example only. It should be appreciated that the present subject matter is not limited to any particular style, model, or configuration of washing machine appliance. Other washing machine appliances having different configurations, different appearances, and/or different features may also be utilized with the present subject matter as well, e.g., vertical axis washing machine appliances.

FIG. 3 provides a perspective view of the dryer appliance of FIG. 1, which is an example embodiment of a household appliance 10, with a portion of a cabinet or housing 12 of dryer appliance 10 removed in order to show certain components of dryer appliance 10. Dryer appliance 10 generally defines a vertical direction V, a lateral direction L, and a transverse direction T, each of which is mutually perpendicular, such that an orthogonal coordinate system is defined. While described in the context of a specific embodiment of dryer appliance 10, using the teachings disclosed herein, it will be understood that dryer appliance 10 is provided by way of example only. Other dryer appliances having different appearances and different features may also be utilized with the present subject matter as well.

Cabinet 12 includes a front side 22 and a rear side 24 spaced apart from each other along the transverse direction T. Within cabinet 12, an interior volume 29 is defined. A drum or container 26 is mounted for rotation about a substantially horizontal axis within the interior volume 29. Drum 26 defines a chamber 25 for receipt of articles of clothing for tumbling and/or drying. Drum 26 extends between a front portion 37 and a back portion 38. Drum 26 also includes a back or rear wall 34, e.g., at back portion 38 of drum 26. A supply duct 41 may be mounted to rear wall 34 and receives heated air that has been heated by a heating assembly or system 40.

As used herein, the terms "clothing" or "articles" includes but need not be limited to fabrics, textiles, garments, linens, papers, or other items from which the extraction of moisture is desirable. Furthermore, the term "load" or "laundry load" refers to the combination of clothing that may be washed together in a washing machine or dried together in a dryer appliance 10 (e.g., clothes dryer) and may include a mixture of different or similar articles of clothing of different or similar types and kinds of fabrics, textiles, garments and linens within a particular laundering process.

A motor 31 is provided in some embodiments to rotate drum 26 about the horizontal axis, e.g., via a pulley and a belt (not pictured). Drum 26 is generally cylindrical in shape, having an outer cylindrical wall 28 and a front flange or wall 30 that defines an opening 32 of drum 26, e.g., at front portion 37 of drum 26, for loading and unloading of articles into and out of chamber 25 of drum 26. A plurality of lifters or baffles 27 are provided within chamber 25 of drum 26 to lift articles therein and then allow such articles to tumble back to a bottom of drum 26 as drum 26 rotates. Baffles 27 may be mounted to drum 26 such that baffles 27 rotate with drum 26 during operation of dryer appliance 10.

The rear wall 34 of drum 26 may be rotatably supported within the cabinet 12 by a suitable fixed bearing. Rear wall 34 can be fixed or can be rotatable. Rear wall 34 may include, for instance, a plurality of holes that receive hot air that has been heated by heating system 40. The heating system 40 may include, e.g., a heat pump, an electric heating element, and/or a gas heating element (e.g., gas burner). Moisture laden, heated air is drawn from drum 26 by an air handler, such as blower fan 48, which generates a negative air pressure within drum 26. The moisture laden heated air passes through a duct 44 enclosing screen filter 46, which traps lint particles. As the air passes from blower fan 48, it enters a duct 50 and then is passed into heating system 40. In some embodiments, the dryer appliance 10 may be a conventional dryer appliance, e.g., the heating system 40 may be or include an electric heating element, e.g., a resistive heating element, or a gas-powered heating element, e.g., a gas burner. In other embodiments, the dryer appliance may be a condensation dryer, such as a heat pump dryer. In such embodiments, heating system 40 may be or include a heat pump including a sealed refrigerant circuit. Heated air (with a lower moisture content than was received from drum 26), exits heating system 40 and returns to drum 26 by duct 41. After the clothing articles have been dried, they are removed from the drum 26 via opening 32. A door (FIG. 1) provides for closing or accessing drum 26 through opening 32.

In some embodiments, one or more selector inputs 102, such as knobs, buttons, touchscreen interfaces, etc., may be provided or mounted on a cabinet 12 (e.g., on a backsplash 71) and are in operable communication (e.g., electrically coupled or coupled through a wireless network band) with the processing device or controller 210. Controller 210 may also be provided in operable communication with components of the dryer appliance 11 including motor 31, blower 48, or heating system 40. In turn, signals generated in controller 210 direct operation of motor 31, blower 48, or heating system 40 in response to the position of inputs 102. As used herein, "processing device" or "controller" may refer to one or more microprocessors, microcontroller, ASICS, or semiconductor devices and is not restricted necessarily to a single element. The controller 210 may be programmed to operate dryer appliance 10 by executing instructions stored in memory (e.g., non-transitory media). The controller 56 may include, or be associated with, one or more memory elements such as RAM, ROM, or electrically erasable, programmable read only memory (EEPROM). For example, the instructions may be software or any set of instructions that when executed by the processing device, cause the processing device to perform operations. It should be noted that controllers as disclosed herein are capable of and may be operable to perform any methods and associated method steps as disclosed herein. For example, in some embodiments, methods disclosed herein may be embodied in programming instructions stored in the memory and executed by the controller.

Figure 4:
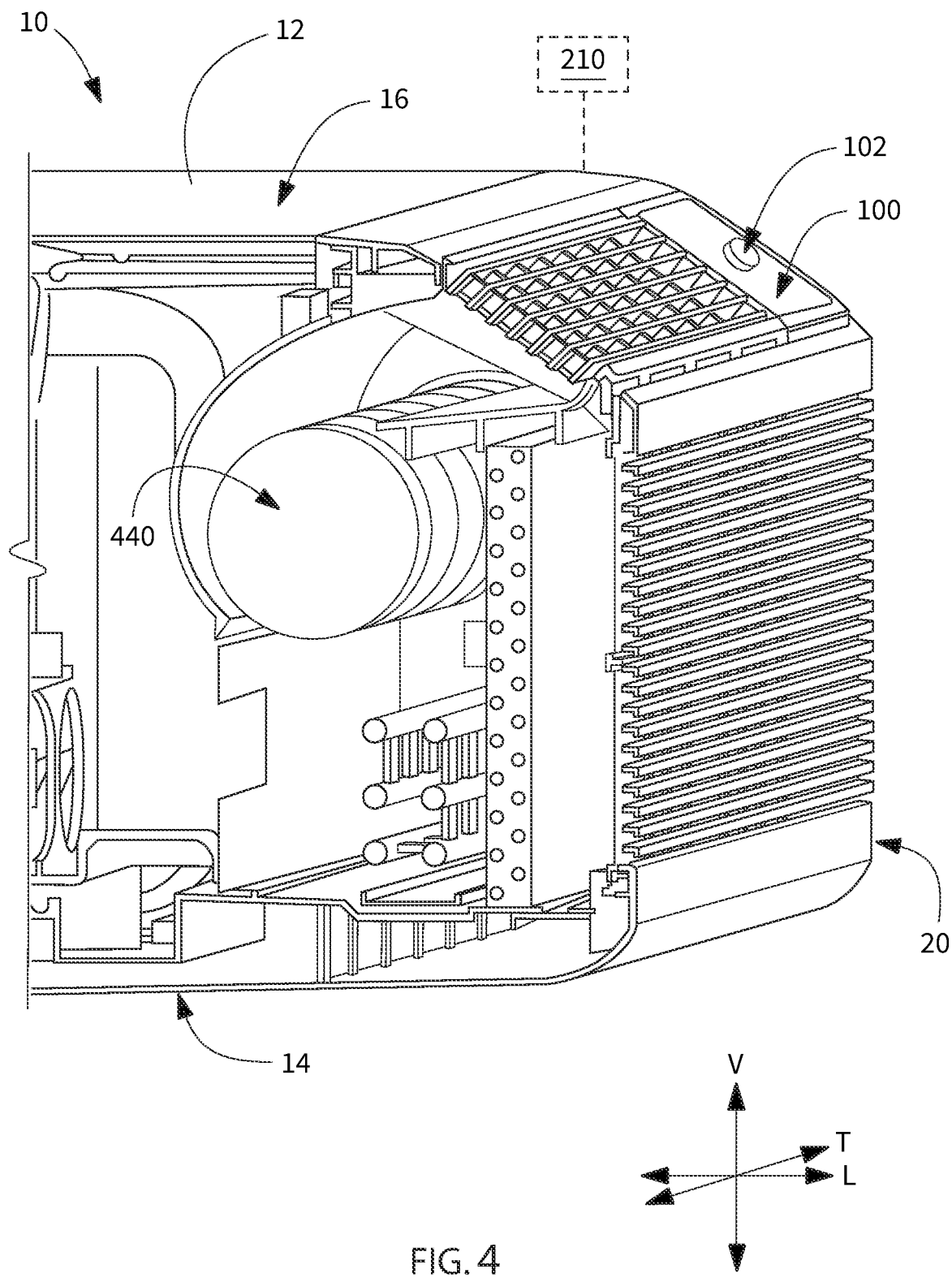
FIG. 4 provides a partial perspective view of an exemplary air conditioner appliance in accordance with additional embodiments of the present disclosure.

In another example embodiment, the appliance 10 may be an air conditioning appliance, e.g., as illustrated in FIG. 4. FIG. 4 illustrates another example embodiment of a household appliance 10, wherein the appliance 10 is a room air conditioner. As illustrated, the exemplary air conditioner 10 includes cabinet 12, user interface panel 100 and user input device 102. In the illustrated example of FIG. 2, the user input device 102 is a control knob. The air conditioner 10 may also include a controller 210, and the controller 210 may be in operative communication with one or more mechanical components of the air conditioner, such as the controller 210 may be configured to activate a mechanical component of the air conditioner 10, e.g., by turning on fan 440 to circulate air.

Figure 5:
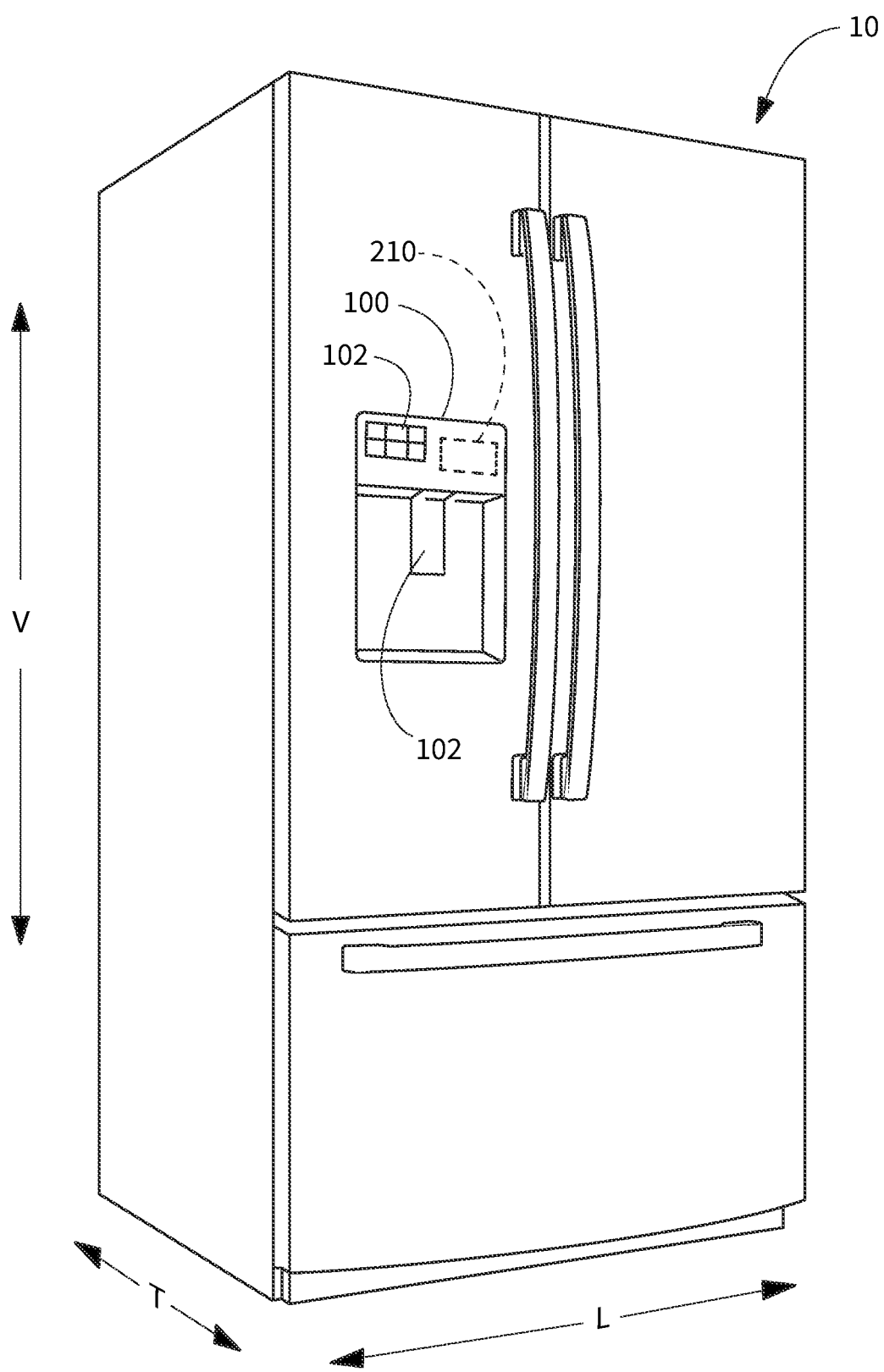
FIG. 5 provides a perspective view of a refrigerator appliance in accordance with one or more additional exemplary embodiments of the present disclosure.

In another example embodiment, the appliance 10 may be a refrigerator appliance, such as is illustrated in FIG. 5. The refrigerator appliance 10 of FIG. 5 is another exemplary embodiment of a household appliance as described herein throughout. Refrigerator appliance 10 is generally referred to as a bottom-mount refrigerator appliance. It should be understood that refrigerator appliance 10 is provided by way of example only. Thus, the present subject matter is not limited to refrigerator appliance 10 and any suitable refrigerator appliance may be utilized in the methods and systems of the present disclosure, e.g., a side-by-side or top mount refrigerator appliance, a refrigerator appliance having different dispenser features (or none at all), and/or a refrigerator appliance having a touchscreen on one of the doors thereof, among other possible variations.

Still referring to FIG. 5, the refrigerator appliance may include a dispenser, e.g., coupled to the user interface panel 100, which may be configured to dispense cold water, hot water, and/or ice. In such embodiments, the user inputs 102 may include, for example, touch inputs (e.g., buttons, touch pad, or touch screen) on the user interface panel 100 and a mechanical actuator or switch for activating the dispenser. As illustrated, dispenser may include a dispenser recess defined on one of the refrigerator doors. The dispenser may include one or more outlets for dispensing ice, chilled liquid water, and/or heated liquid water. Dispenser may, for example, include a paddle 102 (which is an embodiment of a user input for activating the dispenser) mounted below the one or more outlets. As illustrated, the user inputs 102 on the user interface panel 100 may be manipulated, e.g., pressed, to control or select the mode of operation of dispenser, e.g., for selecting chilled liquid water, heated liquid water, crushed ice, and/or whole ice. User interface panel 100 may include a chilled water dispensing button (not labeled), an ice-dispensing button (not labeled) and a heated water dispensing button (not labeled) for selecting between chilled liquid water, ice, and heated liquid water, respectively. The particular structure and operation of the refrigerator and dispensing system are understood by those of skill in the art and, as such, are not described in further detail herein for the sake of brevity.

According to various embodiments of the present disclosure, the household appliance 10 may take the form of any of the examples described above, or may be any other household appliance. Thus, it will be understood that the present subject matter is not limited to any particular household appliance.

It should be understood that "household appliance" and/or "appliance" are used herein to describe appliances typically used or intended for common domestic tasks, such as a laundry appliance, e.g., as illustrated in FIGS. 1 through 3, or an air conditioner appliance (see, e.g., FIG. 4), a dishwashing appliance, a refrigerator (see, e.g., FIG. 5), a water heater, etc., and any other household appliance which performs similar functions in addition to network communication and data processing. Thus, devices such as a personal computer, router, and other similar devices whose primary functions are network communication and/or data processing are not considered household appliances as used herein.

Figure 6:
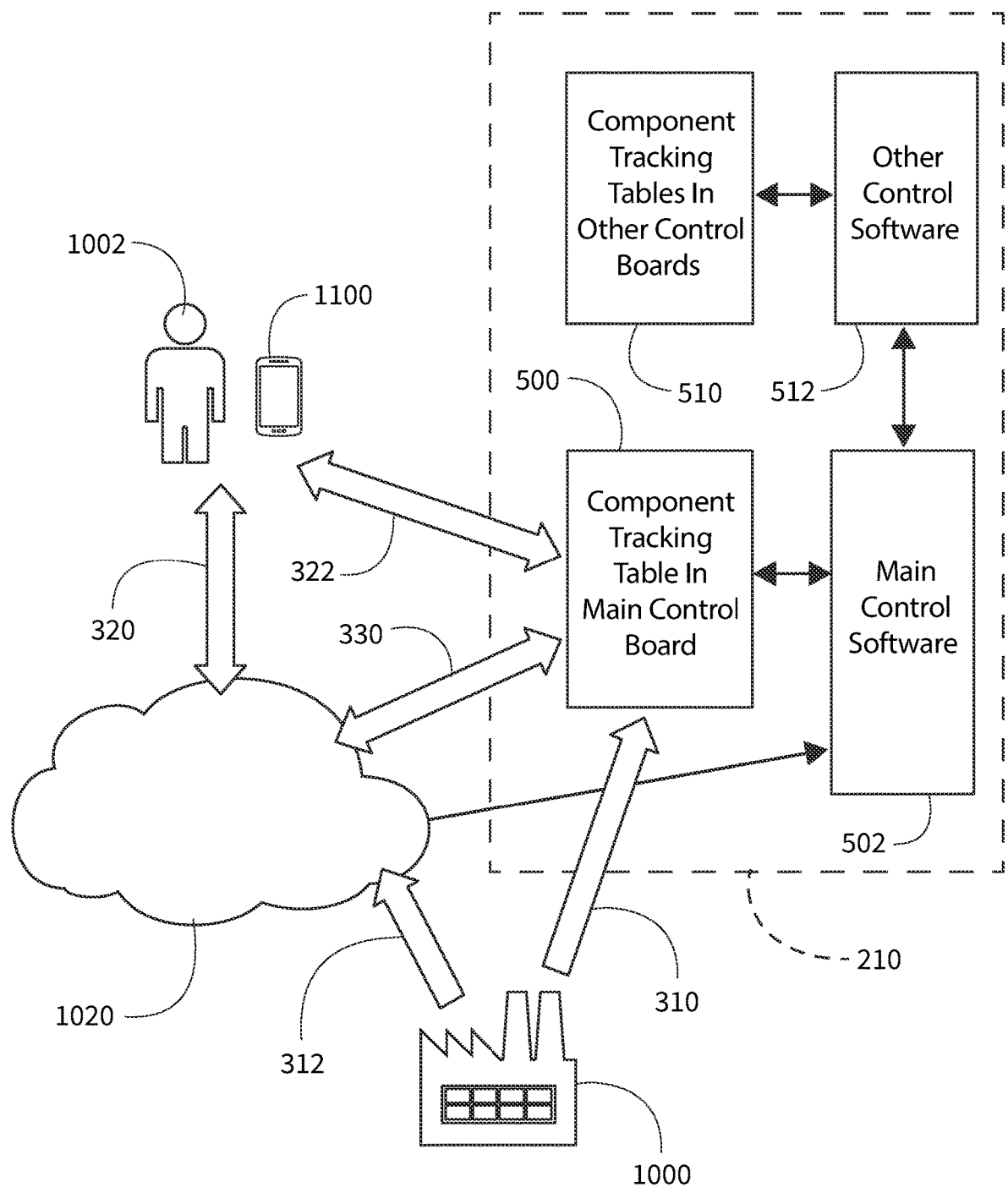
FIG. 6 provides a diagram illustrating an exemplary method of operating a household appliance in accordance with at least one embodiment of the present subject matter.

FIG. 6 provides a diagram of an exemplary system for tracking one or more components, such as mechanical components, such as multi-source components, of a household appliance according to one or more embodiments of the present disclosure. For example, the mechanical component may be a motor, such as the motor 122 of the washing machine appliance or the motor 31 of the dryer appliance, a fan, such as fan 440 of the air conditioning appliance, a pump, a compressor, or valve, among other possible example mechanical components of a household appliance. Also, operating the mechanical component includes changing a physical status of the component, e.g., a speed, position, etc. of the component, such as accelerating the motor, fan, etc., e.g., from a zero starting speed, opening a valve, and/or other changes in the physical state of one or more mechanical components of the household appliance.

The configuration, e.g., hardware configuration, of the household appliance may be stored in a table, e.g., a component tracking table, as indicated at 500 and/or 510 in FIG. 6. The component tracking table may include hardware information such as component types and sources for one or more mechanical components of the household appliance, in particular mechanical components which may have been obtained from one of multiple possible sources, and such information may also be referred to herein as an identity of the component. The exemplary systems and methods of the present disclosure, such as those illustrated in FIG. 6, may provide multi-way, e.g., two-way, synchronization of component tracking tables and redundant storage of the component tracking tables. The exemplary systems and methods of the present disclosure, such as those illustrated in FIG. 6, may also provide a separate or partitioned storage for the component tracking table.

The component tracking table may include specific information for the particular mechanical components installed in the individual household appliance unit to which the component tracking table pertains, such as an identity of the multi-source mechanical component or of each multi-source mechanical component. For example, the component tracking table of the household appliance may be used for specifying or tracking a type or kind of one or more mechanical components of the household appliance, such as a motor of the household appliance and/or other similar components.

As illustrated in FIG. 6, the household appliance may be constructed and/or assembled in a factory 1000. For example, such assembly may include installing one or more multi-source components in the household appliance, where multi-source components are used herein to refer to mechanical components which were obtained from one of multiple possible sources, and in at least some cases the configuration or parameters of the mechanical component may vary depending on which of the multiple possible sources the particular component was procured from. Thus, a component tracking table of the household appliance may be initiated in the factory 1000, such as an identity of each of the one or more multi-source mechanical components may be stored in a local memory of the household appliance, e.g., in a table containing all the identities, where the table is stored in the local memory, in the factory 1000. For example, the table of identities of the multi-source components may be generated before the household appliance leaves the factory 1000 and stored in the local memory of the household appliance at the factory 1000, as indicated by arrow 310, and may be uploaded to the cloud 1020 (as will be described further below, uploading the component tracking table to the cloud 1020 may include, e.g., uploading the component tracking table to one or more remote computing devices in the cloud 1020, such as in a remote database), as indicated by arrow 312. The initial upload of the component tracking table to the cloud 1020, e.g., at the factory 1000 as illustrated in FIG. 6, may be performed via the household appliance itself (such as by synchronizing, e.g., two-way synchronizing, the version of the component tracking table in the local memory with a version of the component tracking table in the cloud 1020) or from a terminal or other computing device in the factory 1000. As will be described in more detail below, the component tracking table may also be updated at various times after the household appliance leaves the factory 1000.

FIG. 6 schematically illustrates one or more remote computing devices in a distributed computing environment, such as a cloud 1020. The household appliance 10, and in particular the controller 210 thereof, may be in communication, e.g., wireless communication, with the cloud 1020. For example, the cloud 1020 may be or include one or more remote computing devices, such as remote computers, servers, and/or databases. Thus, methods according to the present disclosure may also include connecting the household appliance to one or more remote computing devices, e.g., in the cloud 1020. Such connecting step may be performed after the household appliance leaves the factory 1000, such as when the household appliance is connected to the internet and commissioned to a user account in the cloud 1020. As will be described in more detail below, once the household appliance is connected to the cloud 1020, the identity of each of the one or more multi-source mechanical components may be stored in the cloud 1020 and may be synchronized between the controller 210 and the cloud 1020, as indicated by arrow 330, such as later updates to the component tracking table in either of the cloud 1020 or the controller 210 may be synchronized to the other of the cloud 1020 and the controller 210. For example, the identity of each of the one or more multi-source mechanical components may be compiled in a component tracking table, as mentioned above, and the component tracking table may be stored in the cloud 1020.

As mentioned, updates to the component tracking table of the household appliance may be made at various times, such as when the household appliance is maintained, repaired, and/or upgraded by a technician 1002. For example, such maintenance, repair, and/or upgrade may include replacing one or more mechanical components, such as one or more multi-source components of the household appliance.

A change or update to the component tracking table of the household appliance may be received remotely, e.g., via a remote user interface device 1100. The remote user interface device 1100 may be a laptop computer, smartphone, tablet, personal computer, wearable device, smart home system, and/or various other suitable devices. As illustrated in FIG. 6, such updates to the component tracking table may be made by the technician 1002 using a remote user interface device 1100.

The household appliance 10 may be in communication with the remote user interface device 1100 device through various possible communication connections and interfaces. The household appliance 10 and the remote user interface device 1100 may be matched in wireless communication, e.g., connected to the same wireless network. The household appliance 10 may communicate with the remote user interface device 1100 via short-range radio such as BLUETOOTH® or any other suitable wireless network having a layer protocol architecture. As used herein, "short-range" may include ranges less than about ten meters and up to about one hundred meters. For example, the wireless network may be adapted for short-wavelength ultra-high frequency (UHF) communications in a band between 2.4 GHz and 2.485 GHz (e.g., according to the IEEE 802.15.1 standard). In particular, BLUETOOTH® Low Energy, e.g., BLUETOOTH® Version 4.0 or higher, may advantageously provide short-range wireless communication between the household appliance 10 and the remote user interface device 1100. For example, BLUETOOTH® Low Energy may advantageously minimize the power consumed by the exemplary methods and devices described herein due to the low power networking protocol of BLUETOOTH® Low Energy.

The remote user interface device 1100 is "remote" at least in that it is spaced apart from and not physically connected to the household appliance 10, e.g., the remote user interface device 1100 is a separate, stand-alone device from the household appliance 10 which communicates with the household appliance 10 wirelessly. Any suitable device separate from the household appliance 10 that is configured to provide and/or receive communications, information, data, or commands from a user may serve as the remote user interface device 1100, such as a smartphone (e.g., as illustrated in FIG. 6), smart watch, personal computer, smart home system, or other similar device. For example, the remote user interface device 1100 may be a smartphone operable to store and run applications, also known as "apps," and some or all of the method steps disclosed herein may be performed by a smartphone app. The remote user interface device 1100 may include a memory for storing and retrieving programming instructions. Thus, the remote user interface device 1100 may provide a remote user interface which may be an additional user interface to the user interface panel 100. For example, the remote user interface device 1100 may be a smartphone operable to store and run apps, and the remote user interface may be provided as a smartphone app.

As mentioned above, controller 210 is capable of and may be operable to perform any methods and associated method steps as disclosed herein. In some embodiments, the performance of exemplary methods and associated method steps may be distributed, e.g., performed in part by the controller 210 and in part by one or more remote computing devices in the cloud 1020 and/or remote user interface device 1100.

As illustrated in FIG. 6, exemplary embodiments of the present disclosure may further include synchronization of the component tracking table. As indicated by the larger double arrows 320, 322, and 330 in FIG. 6, the component tracking table synchronization may be multi-way synchronization, such as two-way synchronization, such as two-way synchronization between the cloud 1020 and local memory of the controller 210, two-way synchronization between the cloud 1020 and remote user interface device 1100, and two-way synchronization between the remote user interface device 1100 and local memory of the controller 210. Accordingly, when the component tracking table is updated in the local memory of the controller 210 and/or in the cloud 1020, such updates are also automatically transmitted from the one of the controller 210 and cloud 1020 in which the update was made to the other of the controller 210 and the could 1020. For example, the component tracking table may be downloaded to the remote user interface device 1100 from the cloud 1020 (see, e.g., arrow 320) or from the local memory of the controller 210 (see, e.g., arrow 322), then updated in the remote user interface device 1100, e.g., by the technician 1002 after replacing or upgrading one or more of the mechanical components, and the updated component tracking table in the remote user interface device is synchronized between the remote user interface device 1100 and the controller 210 (see, e.g., arrow 322), and between the remote user interface device 1100 and the cloud 1020 (see, e.g., arrow 320).

In some embodiments, the local memory of the controller 210 may be partitioned, such as into at least a component tracking partition and a control partition, among other possible partitions. For example, the component tracking partition and the control partition may be provided within a single memory module of the controller 210, or may be provided in each of multiple physically distinct memory modules, such as, in embodiments where the household appliance includes multiple control boards, e.g., printed circuit boards (PCBs), each of the control boards may include a memory and each memory may include a component tracking partition and a control partition therein. For example, as illustrated in FIG. 6, the controller 210 may include multiple memory modules each with different software loaded therein. In some embodiments, the controller 210 may include memory of a main control board, and a component tracking table 500 may be stored in the memory, e.g., a copy of the component tracking table of the household appliance may be stored in a component tracking partition of the memory, where the memory may be the local memory of the controller 210, or one of the local memories incorporated in the controller 210. The main memory may further include main control software 502, e.g., loaded in a control partition thereof. Some embodiments may include, as mentioned above, a separate memory on a separate control board, such as memory of an other control board or boards, which may include component tracking tables 510 therein, as illustrated in FIG. 6. The other control board or boards may also have a control partition with other control software 512 loaded therein. For example, in embodiments where the household appliance is a refrigerator appliance, the other control board may be a dedicated control board for the dispenser assembly with dispenser control software loaded therein, e.g., in a control partition thereof and with an additional copy of the component tracking table of the household appliance stored in a component tracking partition thereof, e.g., as indicated at 510 in FIG. 6. In such embodiments, the other control board may provide an additional layer of redundancy and an additional backup for the component tracking table of the household appliance.

Figure 7:
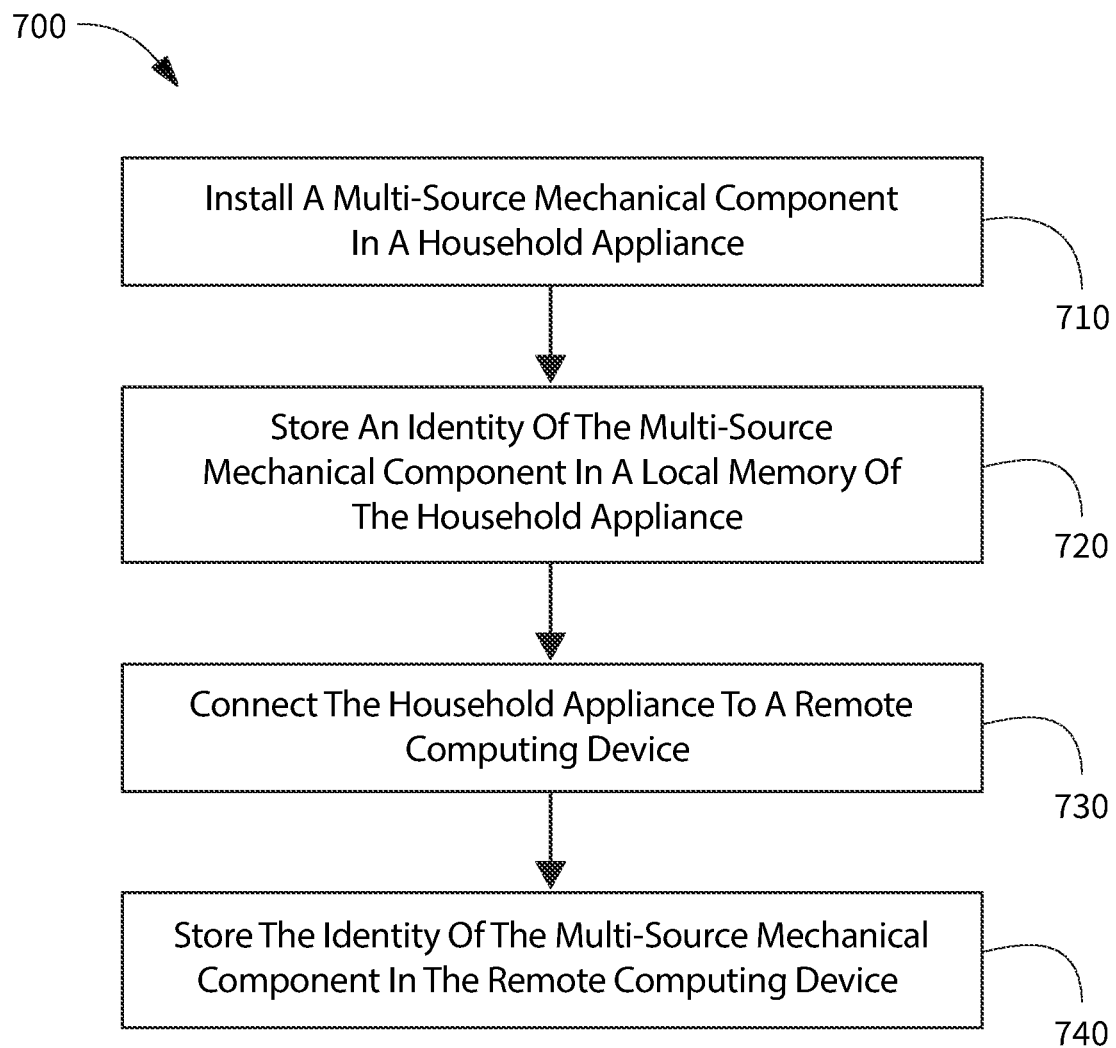
FIG. 7 provides a flow chart illustrating another exemplary method of operating a household appliance in accordance with one or more additional embodiments of the present subject matter.

Turning now to FIG. 7, an example embodiment of a method 700 of operating a household appliance 10 in accordance with the present disclosure is illustrated in a flow chart diagram. As illustrated in FIG. 7, the method 700 may include a step 710 of installing a multi-source mechanical component in the household appliance. Method 700 may also include a step 720 of storing an identity of the multi-source mechanical component in a local memory of the household appliance. Additionally, method 700 may include a step 730 of connecting the household appliance to a remote computing device. Method 700 may further include a step 740 of storing the identity of the multi-source mechanical component of the household appliance in the remote computing device. Each of the foregoing steps may be performed in any order. For example, steps 720 and 740 may be performed in any order, such as the identity of the multi-source mechanical component of the household appliance may be first stored in the local memory and then transmitted to and stored by the remote computing device or may be transmitted to the local memory from the remote computing device, e.g., cloud, and then stored in the local memory.

As mentioned above, the identity of the multi-source mechanical component may be stored in a component tracking table. For example, the household appliance may include more than one multi-source mechanical component therein, and an identity of each of the multi-source mechanical components may be stored in the component tracking table. For example, in some embodiments method 700 may include generating a component tracking table. For example, the multi-source mechanical component may be a first multi-source mechanical component, and method 700 may further include installing a second multi-source mechanical component in the household appliance. In such embodiments, the component tracking table may include the identity of the first multi-source mechanical component and an identity of the second multi-source mechanical component. Thus, storing the identity of the multi-source mechanical component in the local memory of the household appliance may include storing the component tracking table in the local memory of the household appliance, and storing the identity of the multi-source mechanical component in the remote computing device may also include storing the component tracking table in the remote computing device.

The configuration or parameters of the multi-source mechanical component may vary depending on which of the multiple possible sources the particular component was procured from, e.g., depending on the identity of the multi-source component, such that the control software for the household appliance and/or operating parameters of the household appliance, such as electrical power supplied to a motor, etc., may also vary depending on the identity of the multi-source component. Thus, in some embodiments, exemplary methods of operating a household appliance may include selecting control software for the household appliance based on the identity of the multi-source mechanical component. For example, the control software may be selected by the remote computing device, such as from a database in the cloud, and such embodiments may further include transmitting the selected control software from the remote computing device to the household appliance. Additional embodiments of the present disclosure may also or instead include determining an operating parameter for the multi-source mechanical component based on the identity of the multi-source mechanical component. For example, the operating parameter may be determined by the remote computing device, and such embodiments may further include transmitting the determined operating parameter for the multi-source mechanical component from the remote computing device to the household appliance.

In some embodiments, the component tracking table may be updated, such as when one or more of the multi-source mechanical components are replaced or updated. Thus, in some embodiments, methods of operating a household appliance may include removing the multi-source mechanical component from the household appliance and replacing the multi-source mechanical component with an other multi-source mechanical component. In such embodiments, the other multi-source mechanical component may have a different source (and thus a different identity) than the multi-source mechanical component. Thus, such embodiments may further includes removing the identity of the multi-source mechanical component from the local memory, removing the identity of the multi-source mechanical component from the remote computing device, storing an identity of the other multi-source mechanical component in the local memory of the household appliance, and storing the identity of the other multi-source mechanical component in the remote computing device. For example, the identity of the multi-source mechanical component may be removed from one of the local memory and the remote computing device and the identity of the other multi-source mechanical component may be stored in the one of the local memory and the remote computing device, then the identity information, such as in the component tracking table, may be updated accordingly in the other of the local memory and the remote computing device by synchronizing with the one of the local memory and the remote computing device.

For example, the other multi-source mechanical component may be a new component of the household appliance from a different source, such as when a compressor of a refrigerator appliance is replaced with a different compressor. Such embodiments may further include determining, e.g., by the remote computing device, an operating parameter for the other multi-source mechanical component based on the identity of the other multi-source mechanical component, and transmitting, from the remote computing device, the determined operating parameter for the other multi-source mechanical component from the remote computing device to the household appliance. The determined operating parameter for the other multi-source component may be different from a corresponding operating parameter for the original or prior multi-source mechanical component.

As mentioned, the component tracking table of the household appliance may be synchronized back and forth between the local memory and the remote computing device (e.g., cloud), such as two-way synchronization of the component tracking table of the household appliance. Thus, exemplary methods such as method 700 may include both updating the component tracking table of the household appliance in the local memory of the household appliance, e.g., with a new or additional identity of a multi-source mechanical component of the household appliance, and updating the component tracking table of the household appliance in the remote computing device. For example, each time the component tracking table is updated in either one of the local memory or the remote computing device, the component tracking table may also be updated in the other of the local memory and the remote computing device. Thus, whether the component tracking table is updated or modified in the local memory or the remote computing device, the other of the local memory and the remote computing device may also be updated according to the two-way synchronization.

Accordingly, various embodiments of the present disclosure may include transmitting the identity of the multi-source mechanical component from the household appliance to the remote computing device prior to storing the identity of the multi-source mechanical component in the remote computing device. In such embodiments, the step of storing the identity of the multi-source mechanical component in the remote computing device may include storing the received identity of the multi-source mechanical device in the remote computing device. Additional embodiments of the present disclosure may include transmitting the identity of the multi-source mechanical component from the remote computing device to the household appliance prior to storing the identity of the multi-source mechanical component in the local memory of the household appliance. In such embodiments, the step of storing the identity of the multi-source mechanical component in the local memory of the household appliance may include storing the received identity of the multi-source mechanical device in the local memory of the household appliance. Thus, the identity of the multi-source mechanical component, e.g., the component tracking table containing such identity, may be transmitted in either or both directions in order to synchronize the component tracking table in the local memory and in the remote computing device.

In some embodiments, the component tracking table of the household appliance may be separated from other features, such as the main control software, as described above. For example, such embodiments may advantageously permit general updates to the household appliance, such as to the main control software thereof, without affecting, e.g., overwriting, the component tracking table of the household appliance. For example, such embodiments may include methods such as method 700 wherein the local memory of the household appliance is a partitioned memory comprising a component tracking partition and a control partition, and the identity of the multi-source mechanical component, e.g., the component tracking table of the household appliance containing the identity of the multi-source mechanical component, may be stored in the component tracking partition.

In particular embodiments, the household appliance may include multiple control boards, which provides an additional opportunity for redundant storage and separate storage of the component tracking table of the household appliance. For example, in some embodiments of method 700 the household appliance may include a controller which includes a first circuit board and a second circuit board, e.g., that are physically separate and distinct components. In such embodiments, the local memory of the household appliance may be a first memory onboard the first circuit board of the controller, and the second circuit board may include a second memory. In such embodiments, the second memory may also be a partitioned memory, e.g., may include a second component tracking partition and a second control partition. Thus, an additional copy of the component tracking table of the household appliance may also be stored in the second memory, e.g., method 700 may further include storing the component tracking table of the household appliance in the second component tracking partition of the second memory of the second circuit board of the controller. In such embodiments, when either of the first circuit board or the second circuit board (and the respective memories thereon) are updated, e.g., replaced or overwritten, the component tracking table of the household appliance may be restored from the other memory on the other circuit board. For example, method 700 may also include copying the component tracking table of the household appliance from the component tracking partition to the first component tracking partition and/or copying the component tracking table of the household appliance from the first component tracking partition to the second component tracking partition. Further, either of the first or second memories of the controller may provide a backup to the component tracking table of the household appliance stored in the cloud, e.g., remote computing device. Thus, exemplary embodiments of method 700 may also include copying the component tracking table of the household appliance from the second component tracking partition to the remote computing device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a household appliance, the household appliance comprising a controller, the controller comprising a processor and a local memory, the method comprising:
   installing a multi-source mechanical component in the household appliance;
   storing an identity of the multi-source mechanical component in the local memory of the household appliance;
   connecting the household appliance to a remote computing device;
   storing the identity of the multi-source mechanical component in the remote computing device, wherein the multi-source mechanical component is a first multi-source mechanical component;
   installing a second multi-source mechanical component in the household appliance; and
   generating a component tracking table, the component tracking table comprising the identity of the first multi-source mechanical component and an identity of the second multi-source mechanical component, wherein storing the identity of the multi-source mechanical component in the local memory of the household appliance comprises storing the component tracking table in the local memory of the household appliance and storing the identity of the multi-source mechanical component in the remote computing device comprises storing the component tracking table in the remote computing device, wherein the local memory of the household appliance is a partitioned memory comprising a component tracking partition and a control partition, and wherein the component tracking table is stored in the component tracking partition.

2. The method of claim 1, further comprising selecting, by the remote computing device, control software for the household appliance based on the identity of the multi-source mechanical component, and transmitting the selected control software from the remote computing device to the household appliance.

3. The method of claim 1, further comprising determining, by the remote computing device, an operating parameter for the multi-source mechanical component based on the identity of the multi-source mechanical component, and transmitting, from the remote computing device, the determined operating parameter for the multi-source mechanical component from the remote computing device to the household appliance.

4. The method of claim 1, further comprising removing the multi-source mechanical component from the household appliance, replacing the multi-source mechanical component with an other multi-source mechanical component, wherein the other multi-source mechanical component has a different source than the multi-source mechanical component, removing the identity of the multi-source mechanical component from the local memory, removing the identity of the multi-source mechanical component from the remote computing device, storing an identity of the other multi-source mechanical component in the local memory of the household appliance, and storing the identity of the other multi-source mechanical component in the remote computing device.

5. The method of claim 4, further comprising, determining, by the remote computing device, an operating parameter for the other multi-source mechanical component based on the identity of the other multi-source mechanical component, and transmitting, from the remote computing device, the determined operating parameter for the other multi-source mechanical component from the remote computing device to the household appliance.

6. The method of claim 1, further comprising transmitting the identity of the multi-source mechanical component from the household appliance to the remote computing device prior to storing the identity of the multi-source mechanical component in the remote computing device, wherein the step of storing the identity of the multi-source mechanical component in the remote computing device comprises receiving the transmitted identity by the remote computing device and storing the received identity of the multi-source mechanical component in the remote computing device.

7. The method of claim 1, further comprising transmitting the identity of the multi-source mechanical component from the remote computing device to the household appliance prior to storing the identity of the multi-source mechanical component in the local memory of the household appliance, wherein the step of storing the identity of the multi-source mechanical component in the local memory of the household appliance comprises receiving the transmitted identity by the controller of the household appliance and storing the received identity of the multi-source mechanical component in the local memory of the household appliance.

8. A household appliance, comprising:
   a multi-source mechanical component; and
   a controller comprising a processor and a local memory, the controller in operative communication with the multi-source mechanical component, the controller configured for:
      storing an identity of the multi-source mechanical component in the local memory of the household appliance;
      connecting to a remote computing device; and
      transmitting the identity of the multi-source mechanical component to the remote computing device,
   wherein the multi-source mechanical component is a first multi-source mechanical component, the household appliance further comprising a second multi-source mechanical component, wherein the controller is further configured for generating a component tracking table, the component tracking table comprising the identity of the first multi-source mechanical component and an identity of the second multi-source mechanical component, wherein storing the identity of the multi-source mechanical component comprises storing the component tracking table, and transmitting the identity of the multi-source mechanical component to the remote computing device comprises transmitting the component tracking table to the remote computing device, wherein the local memory of the household appliance is a partitioned memory comprising a component tracking partition and a control partition, and wherein the component tracking table is stored in the component tracking partition.

9. The household appliance of claim 8, wherein the controller is further configured for receiving, from the remote computing device, control software for the household appliance based on the identity of the multi-source mechanical component.

10. The household appliance of claim 8, wherein the controller is further configured for receiving, from the remote computing device, an operating parameter for the multi-source mechanical component based on the identity of the multi-source mechanical component.

11. The household appliance of claim 8, wherein the controller is further configured for removing the identity of the multi-source mechanical component from the local memory, storing an identity of an other multi-source mechanical component in the local memory of the household appliance, and transmitting the identity of the other multi-source mechanical component to the remote computing device.

12. The household appliance of claim 11, wherein the controller is further configured for receiving, from the remote computing device, an operating parameter for the other multi-source mechanical component based on the identity of the other multi-source mechanical component.

13. The household appliance of claim 8, wherein the controller is further configured for updating the identity of the multi-source mechanical component in a local memory of the household appliance and transmitting the updated identity of the multi-source mechanical component to the remote computing device.

14. The household appliance of claim 8, wherein the controller is further configured for receiving the identity of the multi-source mechanical component from the remote computing device prior to storing the identity of the multi-source mechanical component in the local memory of the household appliance, wherein the step of storing the identity of the multi-source mechanical component in the local memory of the household appliance comprises storing the received identity of the multi-source mechanical component in the local memory of the household appliance.

* * * * *